United States Patent
Llanos Alonso et al.

(10) Patent No.: US 10,334,065 B2
(45) Date of Patent: Jun. 25, 2019

(54) METHOD FOR DETECTING APPLICATIONS OF MOBILE USER TERMINALS

(71) Applicant: Telefónica, S.A., Madrid (ES)

(72) Inventors: Julia Llanos Alonso, Madrid (ES); Antonio Guzmán Sacristán, Madrid (ES); José Maria Alonso Cebrián, Madrid (ES)

(73) Assignee: Telefónica, S.A., Madrid (ES)

( * ) Notice: Subject to any disclaimer, the term of this patent is extended or adjusted under 35 U.S.C. 154(b) by 0 days.

(21) Appl. No.: 15/980,762

(22) Filed: May 16, 2018

(65) Prior Publication Data

US 2018/0338010 A1  Nov. 22, 2018

(30) Foreign Application Priority Data

May 16, 2017 (EP) .................... 17382279

(51) Int. Cl.
| | |
|---|---|
| *H04W 4/00* | (2018.01) |
| *H04W 4/20* | (2018.01) |
| *H04L 29/08* | (2006.01) |
| *H04W 24/08* | (2009.01) |
| *H04W 4/029* | (2018.01) |

(52) U.S. Cl.
CPC ............. *H04L 67/22* (2013.01); *H04W 4/00* (2013.01); *H04W 4/029* (2018.02); *H04W 4/20* (2013.01); *H04W 24/08* (2013.01)

(58) Field of Classification Search
CPC ......... H04W 4/50; H04W 4/029; H04W 4/24; H04W 72/043
See application file for complete search history.

(56) References Cited

U.S. PATENT DOCUMENTS

| | | | |
|---|---|---|---|
| 9,633,081 B1 | 4/2017 | Procopio | |
| 2009/0138446 A1* | 5/2009 | Kalavade | G06Q 10/0637 |
| 2009/0282027 A1 | 11/2009 | Subotin et al. | |
| 2011/0029657 A1 | 2/2011 | Gueta et al. | |
| 2012/0147769 A1* | 6/2012 | Kalavade | G06Q 10/0637 370/252 |

(Continued)

OTHER PUBLICATIONS

European Search Report and the European Search Opinion dated Oct. 24, 2017 From the European Patent Office Re. Application No. 17382279.2. (8 Pages).

(Continued)

*Primary Examiner* — Diane D Mizrahi

(57) ABSTRACT

A method for detecting applications of mobile user terminals, comprising:
  parsing files of an app to obtain domains of requests and splitting every domain into words to generate an app signature,
  weighting the words to obtain their frequency,
  splitting the mobile traffic into traffic blocks and each traffic block into words,
  generating a traffic vector for each block by including the repetition or frequency of each word in the block,
  comparing the generated traffic vectors with the generated signature by applying a similarity method to obtain the number of times that the signature is detected in the traffic vectors of a mobile terminal,
  estimating a probability of a user having the app installed in the mobile terminal,
  applying a threshold on the probability to discard wrongly detected applications.

8 Claims, 1 Drawing Sheet

(56) References Cited

U.S. PATENT DOCUMENTS

2015/0058488 A1* 2/2015 Backholm ........... H04L 61/1511
709/226

OTHER PUBLICATIONS

Li et al. "Distance Weighted Cosine Similarity Measure for Text Classification", Proceedings of the 14th International Conference on Intelligent Data Engineering and Automated Learning, IDEAL 2013, Hefei, China, Oct. 20-22, 2013, LNCS 8206: 611-618, Oct. 22, 2013.
Powers "Evaluation: From Precision, Recall and F-Measure to Roc, Informedness, Markedness & Correlation", Journal of Machine Learning Technologies, 2(1): 37-63, Available Online Dec. 15, 2011.

* cited by examiner

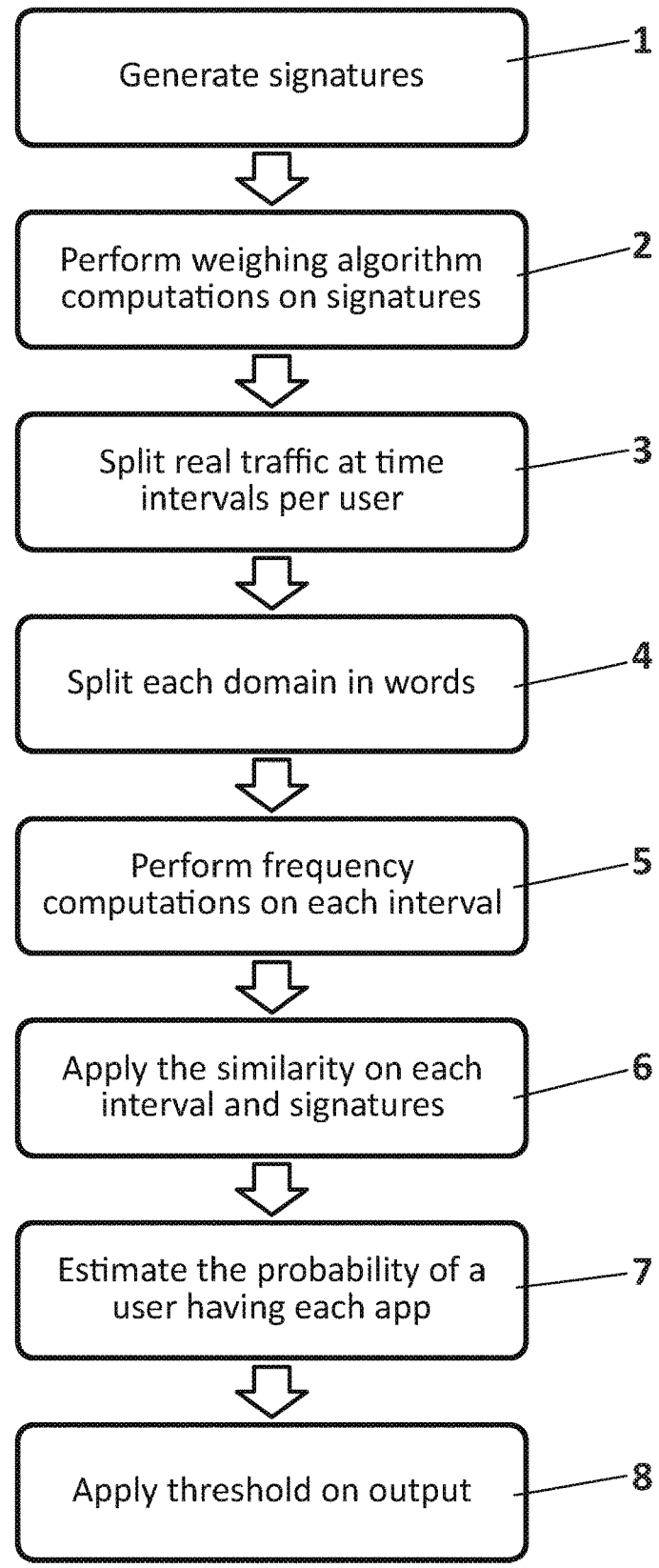

METHOD FOR DETECTING APPLICATIONS OF MOBILE USER TERMINALS

RELATED APPLICATION

This application claims the benefit of priority of European Patent Application No. 17382279.2 filed May 16, 2017, the contents of which are incorporated herein by reference in their entirety.

FIELD AND BACKGROUND OF THE INVENTION

The present invention has its application within the telecommunication sector, more specifically, relates to the analysis of mobile user traffic.

More particularly, the present invention refers to a method for detecting from mobile traffic applications (apps) of mobile user terminals (smartphones, tablets, etc.).

Smartphones offer users the possibility to install on them whatever applications (apps) they decide to (apart from preinstalled apps). These apps belong to categories as entertainment, sports, productivity, travel . . . . Therefore, applications installed in a certain smartphone provide useful information about its user profile, to be understood as the set of habits and preferences of a person.

Those apps require Internet connection for tasks as content update or access authorization. The set of queries or requests sent to retrieve data from Internet is here defined as traffic. Being a protocol a set of predefined rules that defines the way of transferring information, requests information may vary depending on the used protocol. Examples of information appearing in requests are: source IP, request date and time, domain or user agent. The latter concepts, domain and user agent, are defined as follows:
  Domain is the unique name that identifies a website on the Internet.
  User agent includes information about several aspects like: application source, device operating system or software version. It has to be emphasized that not every protocol includes the user agent field.

The smartphones have recently experimented an exponential growth in terms of number of users and hours spent with them. In this context, knowing applications used by a customer will allow to precisely define its profile. A correct user profile is the key to success in multiple use-cases like recommender systems, protection against possible security threats (malicious apps) or statistical analysis, as defined as follows:
  Recommender systems: Those systems are present in several areas such as cinema, music or shopping. They aim to predict user interests, i.e. user profile, on those areas using information of his activity. Based on these predictions, they provide recommendations to users about elements that match their interests. As more precise the predictions, the better the recommendations.
  Malicious apps: Applications classified as malicious are, for example, those tricking users into unwanted pays or subscriptions.
  Statistical analysis: Analysis over user profiles and their distribution, which can guide, for example, further commercial or investment decisions.

Mobile Network Operators (MNOs) can obtain information required to define users profile from mobile traffic. A request is generated each time a mobile user interacts with an app on its smartphone. The request passes through the MNO infrastructure, which both stores it in a database as sends it to the Internet. Data stored in the MNO database is simplified information of HTTP and DNS requests. Hypertext Transfer Protocol (HTTP) is a protocol for transferring hypermedia files. Domain Name System (DNS) is a naming system for clients or services connected to the Internet or to a private network. DNS associates a domain name with an internet protocol address (IP). The information stored in the database is the domain and the date and time of the request, i.e. the complete URL is not consulted in any case. In addition, all stored data are anonymized.

There are approaches for analyzing mobile traffic based on domain information. However, relation between domains and applications is not bijective. Unique domains, i.e. domains exclusively accessed by an app, are the less frequent. Instead, there are some domains accessed by many apps. In the latter case, the knowledge of the domain does not univocally define the application.

There are also approaches for analyzing mobile traffic based on user agent. User agent presents two major drawbacks: not all HTTP petitions have user agent value, and applications developers decide the value of user agent field, so they can use another apps' user agent instead of setting their own.

Finally, there is a great variability in the requests of a concrete application. It is due, inter alia, to the different operating systems or mobile user devices (smartphones, tablets). Even different executions of the same application on the same terminal do not maintain the same request order. Some issues related to the requests variability are, to name but a few: request may be cached, latencies between requests vary depending on the mobile use, list of domains consulted by an app may vary between devices, or dynamic content include noise in executions.

Therefore, it is highly desirable to develop a method of apps detection from the mobile traffic which allows the MNOs to get a more precise user profile.

SUMMARY OF THE INVENTION

The present invention solves the aforementioned problems and overcomes previously explained state-of-art work limitations by providing a method for detecting applications (apps) downloaded and/or used by a user in his/her mobile terminal (e.g., a smartphone, tablet, etc.). The apps detection is based on the analysis of domain information collected from the mobile user's traffic. More particularly, the method of apps detection uses an analysis of domains by words considering their frequency and so the method is device and request order independent.

An aspect of the present invention refers to a method for detecting applications of mobile users, the applications generating a train of files associated with one or more mobile user terminals and each mobile user terminal engaged in the generation of mobile user traffic, which comprises the following steps:
  parsing the train of files to obtain the set of Internet domains to which requests from an application are made and splitting every obtained domain into a list of words which generates a signature of the application,
  weighting the words of the generated signature to obtain a frequency of each word,
  splitting the mobile user traffic of each mobile user terminal into traffic blocks, each traffic block being a set of domains requested in a time interval, and splitting each traffic block into words;

generating a traffic vector for each traffic block by including the words of the traffic block and the frequency of each word according to its repetition on the traffic block, comparing the generated traffic vectors with the generated signature of each application by applying the cosine similarity method and obtaining, through this comparison, a number of times that the generated signature of each application is detected in the generated traffic vectors of a mobile user terminal.

The present invention has a number of advantages with respect to prior art, which can be summarized as follows:

The proposed method profiles a user more precisely and this is useful to propose successfully by a recommender system, e.g., a concrete use-case of the invention could be an apps recommender.

The invention allows the detection of malicious applications so that the user can avoid them or, at least, to understand the risks.

The invention allows users to be profiled by means of knowing the categories of the apps on their smartphones and the frequency of its use. Statistical analysis over these user profiles can lead to further commercial or investment decisions based on the users' apps.

The proposed method runs using only DNS and HTTP traffic, specifically the domain of the requests.

Every single module of the proposal (collection of isolated traffic by application, signatures generation, traffic parsing, evaluation . . . ) can be automatized to be a feedback system.

The method is robust to temporal incoherence in requests arrival order.

The method is learning-designed, improving the precision of phone apps detection.

The method can work in real-time or in batch-mode (i.e. in non-real-time).

These and other advantages will be apparent in the light of the detailed description of the invention.

BRIEF DESCRIPTION OF THE SEVERAL VIEWS OF THE DRAWINGS

For the purpose of aiding the understanding of the characteristics of the invention, according to a preferred practical embodiment thereof and in order to complement this description, the following FIGURES are attached as an integral part thereof, having an illustrative and non-limiting character:

FIG. 1 shows a flow chart of a method for detecting applications in mobile traffic, according to a preferred embodiment of the invention.

DESCRIPTION OF SPECIFIC EMBODIMENTS OF THE INVENTION

The matters defined in this detailed description are provided to assist in a comprehensive understanding of the invention. Accordingly, those of ordinary skill in the art will recognize that variation changes and modifications of the embodiments described herein can be made without departing from the scope and spirit of the invention. Also, description of well-known functions and elements are omitted for clarity and conciseness.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

FIG. 1 presents a main chart flow of the method steps, divided in eight main stages:

Stage 1, Generate signatures (1): Each app generates a train of files, files generated with isolated traffic, multiple times and with multiple devices. All the samples are grouped for each app and the method parses these train files. From each group associated with an app, only the domains to which requests are made by the app are considered. Every domain is splitted to get a list of words that represent each app. The list of words corresponding to each application is defined here as the app signature.

Stage 2, Perform weighting (2) algorithm computations on the generated signatures: words on the signature are weighted, the range of weights being 0-1. Higher weights are assigned to most frequent and significant words.

Stage 3, Split real traffic (3) at time intervals per user: user traffic is divided in blocks. Division is performed attending to temporal criteria, i.e. a block is formed with the mobile traffic on a specific time interval. The blocks are further analyzed in search of the predominant app.

Stage 4, Split each traffic block (4) in words: each traffic block is a set of domains queried in a time interval. Domains are here splitted, using the dot as the splitting criteria. Hence, the traffic block is now a set of words. Repetition is allowed.

Stage 5, Generate traffic vectors by performing frequency (5) computations on each interval: the traffic block is here reduced to a vector including words and their frequency attending to their repetition on the block.

Stage 6, Apply the similarity (6) on each interval and signatures: traffic vectors are here compared against app signatures via the known cosine similarity method (described, for example, by Li, B. et al. in "Distance weighted cosine similarity measure for text classification", Intelligent Data Engineering and Automated Learning—IDEAL, volume 8206 of Lecture Notes in Computer Science, Springer, pp. 611-618, 2013). The maximum value for an app signature results in the definition of a tern user-app-value for that block. A list of terns is generated for the traffic.

Stage 7, Estimate the probability (7) of a user having each app: the likelihood for a user of having an app installed is estimated based on evidences of previous output. Those evidences are the number of times the app was detected and the likelihood, i.e. the similarity result of each detection.

Stage 8, Apply threshold (8) on the output: irrelevant results must be discarded. To this aim, a threshold (minimum likelihood value required) is fixed avoiding low-likelihood results to be considered. The threshold is fixed by means of the maximum value of F1, F1 being one of the F-measures described by Powers, D. M. in "Evaluation: from precision, recall and F-measure to ROC, informedness, markedness and correlation" (Journal of Machine Learning Technologies, Vol. 2, No. 1, pp. 37-63, 2011). F1 measure is defined in terms of precision and recall for the model evaluation. Precision measures the fraction of tuples user-app successfully detected against those wrongly detected. Recall measures the fraction of tuples user-app successfully detected against those miss-detected.

Real time solution pre-calculates the first two stages. For example, in a real-time use case where a user wants to know which apps can be detected from his smartphone, a possible implementation can be described as follows:

Each time set, e.g. 5 minutes, the method automatically collects the generated traffic since previous check. Stages 3 to 6 of FIG. 1 are applied to this traffic, resulting in a user-app-value tern list.

Stage 7 is run on the tern list. The outputs of this stage are the estimated probabilities of apps being installed on the target smartphone considering only this 5 minutes of traffic. They are stored in the database for the final combination. The outputs of all the stages 7 for the whole traffic are lately combined, obtaining a final set of applications and its probabilities associated.

At this point, a decay function comes into play, which is responsible for reducing the resulting value of likelihood by observing absence of evidence. It includes a temporal factor in the likelihood estimation, weighting positively the most recent evidences and vice versa.

Looking for the applications installed on the analyzed smartphone, the probabilities are thresholded. Threshold has been fixed in the training process, looking to maximize the detected apps and avoiding false positives.

Note that in this text, the term "comprises" and its derivations (such as "comprising", etc.) should not be understood in an excluding sense, that is, these terms should not be interpreted as excluding the possibility that what is described and defined may include further elements, steps, etc.

What is claimed is:

1. A method for detecting applications of mobile user terminals, wherein each application generates files associated with at least one mobile user terminal generating mobile user traffic, the files comprising requests to a set of Internet domains, comprising:

parsing the files to obtain the set of Internet domains to which requests from an application are made and splitting every obtained domain into a list of words which generates a signature of the application, weighting the words of the generated signature to obtain a frequency of each word, splitting the mobile user traffic into traffic blocks, each traffic block being a set of domains requested in a time interval, and splitting each traffic block into words;

generating a traffic vector for each traffic block by including the words of the traffic block and the frequency of each word according to a repetition of each word on the traffic block, comparing the generated traffic vectors with the generated signature of each application by applying a cosine similarity method to obtain a number of times that the generated signature of each application is detected in the generated traffic vectors associated with the, at least one, mobile user terminal.

2. The method according to claim 1, wherein applying the similarity method results in a tern formed by the signature of the application, the user and a value of similarity.

3. The method according to claim 2, wherein estimating the probability is applied on the tern resulted from the similarity method.

4. The method according to claim 1, further comprising:
estimating a probability of a user having each application installed in the mobile user terminal.

5. The method according to claim 4, further comprising:
applying a minimum likelihood threshold on the estimated probability to distinguish a successfully detected application from a wrongly detected application, the successfully detected application having an estimated probability which exceeds the minimum likelihood threshold.

6. The method according to claim 5, wherein the threshold is defined by means of a maximization of the F1-measure.

7. The method according to claim 1, wherein the splitting of the obtained domain into words uses the dot as the splitting criteria.

8. A non transitory computer program product comprising computer-readable instructions which, when executed on a computer, cause the computer to carry out all the steps of the method as defined in claim 1.

* * * * *